United States Patent [19]
Kuzunuki et al.

[11] Patent Number: 5,592,189
[45] Date of Patent: Jan. 7, 1997

[54] APPARATUS FOR USE IN OFFICES ETC.

[75] Inventors: Soshiro Kuzunuki; Yasuro Hori, both of Katsuta; Shuichi Okabe, Yokohama; Fumitaka Ito, Chiba-ken, all of Japan

[73] Assignee: Hitachi, Ltd., Tokyo, Japan

[21] Appl. No.: 469,789

[22] Filed: Jun. 6, 1995

Related U.S. Application Data

[63] Continuation of Ser. No. 942,199, Sep. 9, 1992, abandoned.

[30] Foreign Application Priority Data

Sep. 9, 1991 [JP] Japan .................................. 3-227843

[51] Int. Cl.⁶ .................................................. G09G 3/36
[52] U.S. Cl. .................................... 345/87; 345/117
[58] Field of Search ........................ 345/55, 87, 109, 345/904, 38, 50, 30, 32, 117; 359/36, 81, 70; 379/52, 396

[56] References Cited

U.S. PATENT DOCUMENTS

| | | | |
|---|---|---|---|
| 4,503,407 | 3/1985 | Ogura | 340/765 |
| 4,653,094 | 3/1987 | Rasmussent et al. | 340/716 |
| 4,704,003 | 11/1987 | Komaki | 359/81 |
| 4,953,205 | 8/1990 | Yang | 379/396 |
| 5,123,192 | 6/1992 | Hsieh | 359/36 |
| 5,128,782 | 7/1992 | Wood | 340/784 |
| 5,170,271 | 12/1992 | Lackner et al. | 340/784 |

FOREIGN PATENT DOCUMENTS 3-104361  7/1991  Japan .

*Primary Examiner*—Kee M. Tung
*Assistant Examiner*—Doon Chow
*Attorney, Agent, or Firm*—Antonelli, Terry, Stout & Kraus

[57] ABSTRACT

An apparatus for use in offices includes a planar liquid crystal shutter disposed at least a portion of a surface of a housing of the apparatus, the shutter being set to a transparent state or a non-transparent state depending on an input signal supplied thereto, and a controller for applying to the shutter a control signal to control the transparent or non-transparent state thereof.

9 Claims, 5 Drawing Sheets

APPARATUS FOR USE IN OFFICES ETC.

This application is a continuation application of Ser. No. 07/942,199, filed Sep. 9, 1992, now abandoned.

BACKGROUND OF THE INVENTION

The present invention, relates to such apparatuses for use in offices etc. as various communication facilities including facsimile devices, telephone sets, terminals for conferences, terminals for local area networks (LAN), and terminals of integrated service digital networks (ISDN); various input/output devices including printers and image scanners; copying machines, word processors, and personal computers.

Conventionally, operation states of communication apparatuses such as a facsimile device and a telephone set are notified to the user by use of voices and lamps as described in the JP-A-3-19567.

With the advance of the personal apparatuses for communications together with the development of dial-in systems, there have been installed a plurality of communication apparatuses in offices. This tendency is expected to be further enhanced. However, according to the prior art above, in an operation of the apparatus to connect a call or in an abnormal state thereof, the operation state is notified only by an audible tone or a lamp on a console panel thereof. This consequently leads to a problem that it is difficult for the user to recognize from a position apart from the apparatus (for example, by about several meters) which one of the apparatuses is receiving a call or which one thereof is in the fault.

In addition, each of the apparatuses such as coping machines and facsimile devices has, for example, a form feeder unit as an internal constituent component in a housing thereof. An abnormality, for example, a paper jam, may easily take place in the form feeder. To cope with the difficulty, the copying machine or the like is-provided with a cover, which can be opened and closed when necessary, at a position of the housing associated with the form feeding equipment. However, in the conventional copying machine, when the cover is closed, the inside of the form feeder cannot be visually checked by the operator. Consequently, each time an abnormality such as a paper jam occurs, the operator is inconveniently required to open the cover to check whether or not a sheet of paper is jammed therein.

In this connection, some application examples using a polymer dispersed liquid crystal display in fields other than the communication fields have been described in U.S. Pat. No. 4,749,261 corresponding to JP-A-62-229116, U.S. Pat. No. 4,613,207 corresponding to JP-A-61-502286, and U.S. Pat. Nos. 4,893,903 and 4,382,995 corresponding to JP-A-62-161189. In these applications, the technology is applied to a windowpane, a sunroof of an automobile, a liquid crystal display of a projection type, and a road sign.

SUMMARY OF THE INVENTION

It is therefore an object of the present invention to provide an apparatus for use in offices in which operation states thereof can be easily recognized from a position apart therefrom.

Another object of the present invention is to provide an apparatus for use in offices in which at an occurrence of an abnormality such as a paper jam, a desired internal structure such as a form feeding unit can be externally observed without opening a cover or the like thereof.

In order to achieve the objects above, according to an aspect of the present invention, there is provided an apparatus for use in offices etc. including a planar liquid crystal shutter disposed at least a portion of a surface of a housing of the apparatus, the shutter being set to a transparent state or a non-transparent state depending on an input signal supplied thereto, and a control unit for applying to the shutter a control signal controlling the transparent or non-transparent state of the shutter.

The apparatus may further include a color developing unit. In this case, the color developing operation is activated or deactivated depending on the transparent or non-transparent state of the shutter, thereby presenting the operation state of the apparatus. Consequently, since the shutter is formed in a planar shape, when the size there of is appropriately determined in advance, the operation state thereof can be visually and easily checked from a position apart therefrom. The color developing unit may include a color sheet or may be constituted with a color filter and a light emitting section for illuminating a light thereonto. The control unit may apply to the shutter, when the apparatus is in a call connection state, a control signal for setting the shutter to the transparent state. In this case, the call connection state can be displayed as the operation state of the apparatus. The control unit may apply to the shutter, when the apparatus is in an abnormal state, a control signal for setting the shutter to the transparent state. In this case, the abnormal state can be displayed as the operation state of the apparatus. The control unit may apply to the shutter, when the apparatus is in a ready state, a control signal for setting the shutter to the transparent state. In this case, the ready state can be displayed as the operation state of the apparatus.

Moreover, In the apparatus, the shutter may be disposed at a position on the surface of the housing, the position corresponding to a desired internal structure of the apparatus in the housing thereof. In this case, the control unit may apply to the shutter, at an occurrence of an abnormality related to the internal structure, a control signal for setting the shutter to the transparent state. With this provision, at an occurrence of an abnormality such as a paper jam, the desired internal structure such as a form feeding unit can be externally observed without opening the cover or the like, thereby removing the inconvenience of the prior art.

Furthermore, in the apparatus, the shutter may be formed with a polymer dispersed liquid crystal. In this case, molecules of the liquid crystal are confined in highly polymerized molecules, there can be manufactured a large-area, high-contrast shutter having a reduced thickness at a low cost. Moreover, the shutter may be fabricated with flexibility. For the large-area and high-contrast shutter, the visibility of the operation state of the apparatus can be much more improved. Namely, even when the thickness of the apparatus is minimized, the size thereof is not increased. Thanks to the flexibility of the shutter, it is possible to fix the shutter onto a housing of the apparatus or to use the shutter as a surface or plane in a portion of the housing.

In addition, the apparatus may further include an audible tone notifying unit for generating an audible tone indicating an operation state of the apparatus. In this situation, the control unit may apply the control signal to the shutter at a timing synchronized in time with the generation of the audible tone from the audible tone notifying unit. In this case, the operation state of the apparatus can be recognized also by auditory sense.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to FIGS. 1 to 8, description will be given of embodiments according to the present invention.

In the description of the embodiments, the present invention is applied to a facsimile apparatus, which however does not limit the present invention. Namely, the present invention can be applied to any apparatuses for use in offices etc., for example, to various communication facilities including multi-functional telephone sets, cordless telephones, answering machines or telephones, terminals for conferences, terminals for local area networks, and terminals for integrated service digital networks; various input/output devices including printers and image scanners; copying machines, word processors, and personal computers.

Figure 1:
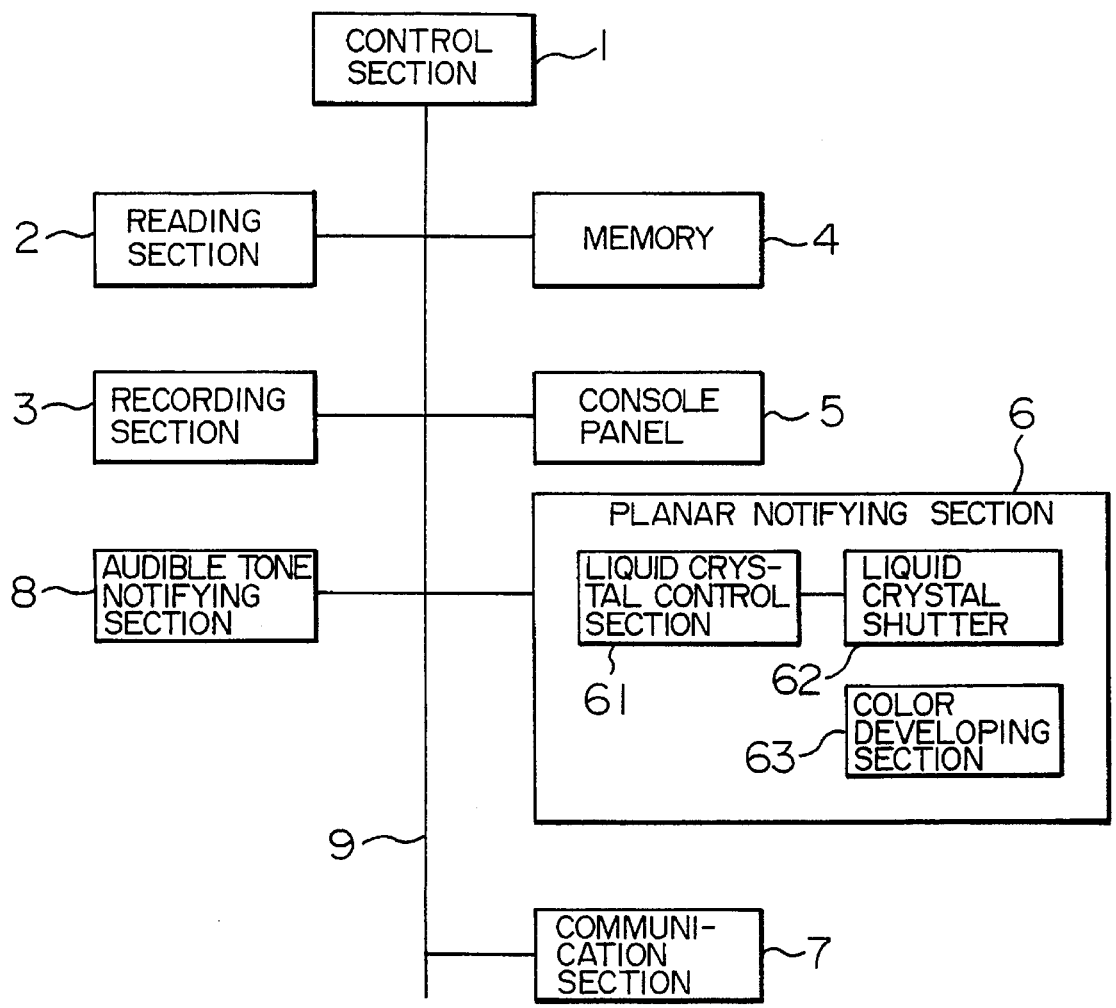
FIG. 1 is a block diagram schematically showing the structure of a facsimile device in an embodiment according to the present invention.

FIG. 1 is a block diagram showing the structure of a facsimile device in an embodiment according to the present invention. The configuration includes a control section 1 for controlling the overall operation of the facsimile, a reader section 2 for reading the contents of an original document to be transmitted, a recording section 3 for recording on a sheet of paper the contents of an original document received by the facsimile, a memory section 4 for accumulating the contents of documents read by the reader section 4 and those of documents received by the communication section 7, a notifying section 6 on a surface or plane of a housing associated with the primary portion of the present invention, the section 6 being constituted with a liquid crystal control section 61, a liquid crystal shutter 62, and a light emitting section 63 disposed on a rear side of the shutter 62, a communication section 7 for achieving communications with communicating partners via communication lines, an audible tone notifying section 8 for notifying an operation state of the facsimile with an audible tone such as a voice or a synthesized oscillation tone, and a bus signal line 9 for establishing interfaces between the control section 1 and the other constituent components.

In this regard, as will be described later, the color developing section 63 may be dispensed with depending on the position where the liquid crystal shutter 62 is arranged. With this provision, when the liquid crystal shutter 62 becomes to be transparent, it is possible to externally observe the internal constitution of the facsimile equipment in the housing.

Description will now be given of an outline of the operation of the facsimile apparatus shown in FIG. 1. First, the operator specifies a communicating partner from the panel 5 to initiate the reader section 1 to read the contents of a document to be transmitted. The contents thus obtained are compressed into facsimile signals to be accumulated in the memory section 4. On the other hand, the stored contents of the document are sent via the communication section 7 to the destination thus specified. Moreover, the contents of a document received via the communication section 7 are once accumulated in the memory section 4 and thereafter are recorded by the recording section 3 onto a sheet of recording form. While achieving the operations above, the operation state of the facsimile is reported by the notifying section 6 and the audible tone notifying section 8 to the operator and other persons near the facsimile apparatus.

Next, description will be mainly given of a method of implementing the notifying section 6 in the housing surface. The other components of the facsimile have been commonly known and hence will not be described.

Figure 2A:
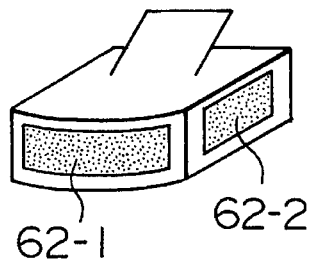
FIG. 2A is a perspective view showing the appearance of the facsimile device in an embodiment according to the present invention.
Figure 2B:
FIG. 2B is a perspective view showing the appearance of a multi-functional telephone apparatus in an alternative embodiment according to the present invention.
Figure 2C:
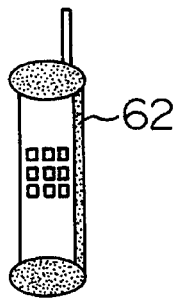
FIG. 2C is a perspective view showing the appearance of a cordless telephone set in further an alternative embodiment according to the present invention.

FIGS. 2A to 2C show examples of application of a liquid crystal shutter to communication apparatuses. In FIG. 2A, liquid crystal shutters 62-1 and 62-2 are disposed respectively on a front surface and a side surface of a facsimile device. In the configuration of FIG. 2B, the liquid shutter is arranged on the overall surface of the handset of a multi-functional telephone apparatus. In FIG. 2C, a liquid crystal shutter 62 is disposed on a portion of the surface of a handset of a cordless telephone. Particularly, the liquid crystal shutter is advantageously arranged on other than the console panel, i.e., a portion of a surface such that the operation state can be easily recognized from a position apart therefrom. For each of the shutter 62-1 of FIG. 2A, the shutter of FIG. 2B, and the shutter 62 of FIG. C, a color sheet is disposed as a color developing section 63. For example, as shown in FIGS. 2B and 2C, in a case where a bell is ringing, when the liquid crystal shutter 62 is changed to be transparent and the color sheet is activated to develop a color of green to notify the condition, the pertinent telephone set related to a terminating call can be easily recognized from a position apart from the apparatus.

Figure 3:
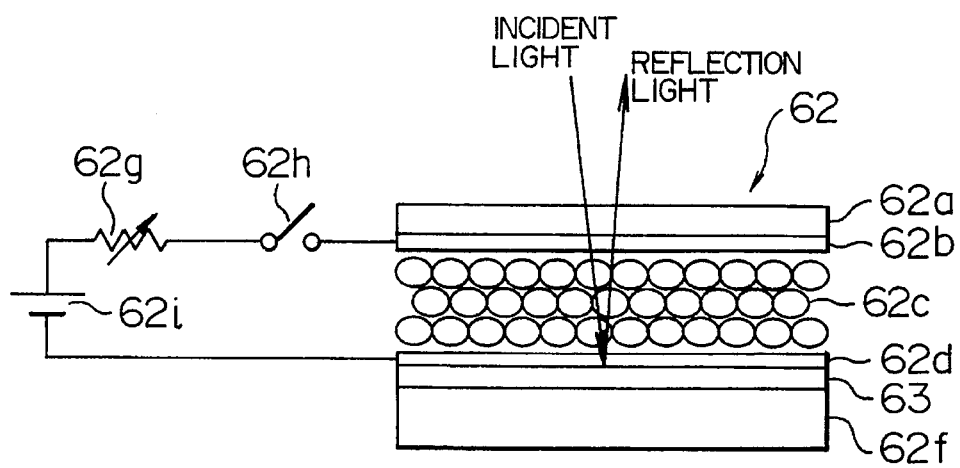
FIG. 3 is a diagram showing an example of the structure of an assembly including a liquid crystal shutter and a color developing section and an example of a method of applying a voltage to the liquid crystal shutter.

FIG. 3 shows an example of the constitution of the assembly including a liquid crystal shutter 62 and a light emitting section 63 and an example of a method of applying a voltage to the liquid crystal shutter 62. In this configuration, the shutter 62 includes a polymer dispersed liquid crystal 62c. Naturally, the shutter 62 according to the present invention may be constructed with various kinds of liquid crystal other than the polymer dispersed liquid crystal. The configuration of FIG. 3 includes a layer 62a manufactured with a transparent material to protect the surface of the liquid crystal 62c, transparent electrodes 62b and 62d for applying an electric field to the liquid crystal 62c, a color sheet 63, a substrate 62f which may be rigid or flexible, a resistor 62g for regulating the electric field, a switch 62h for turning the electric field on or off, and a power source 62i.

In this connection, as the color developing section, there may be employed in place of the color sheet 63, for example, a color filter and a light emitting unit which illuminate a light onto the color filter.

In FIG. 3, when the switch 62h is turned on, an incident light to the shutter 62 passes through the liquid crystal 62c to be reflected on the color sheet 62f, thereby developing a reflection light. In consequence, when the switch 62h is turned on, the color sheet 63 becomes to be externally visible. When the switch 62h is turned off, the incident light cannot pass through the liquid crystal 62c and hence the color sheet 63 becomes invisible.

Figure 4A:
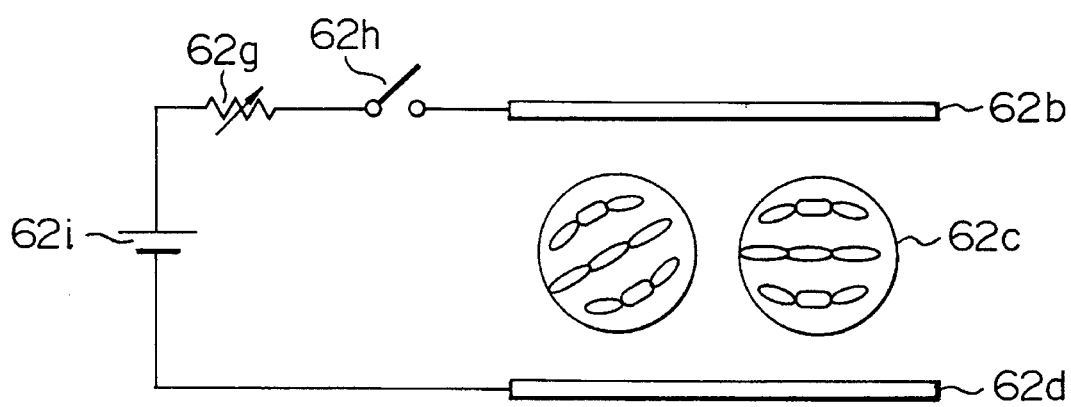
FIG. 4A is a diagram schematically showing a state of a polymer dispersed liquid crystal free from a voltage.
Figure 4B:
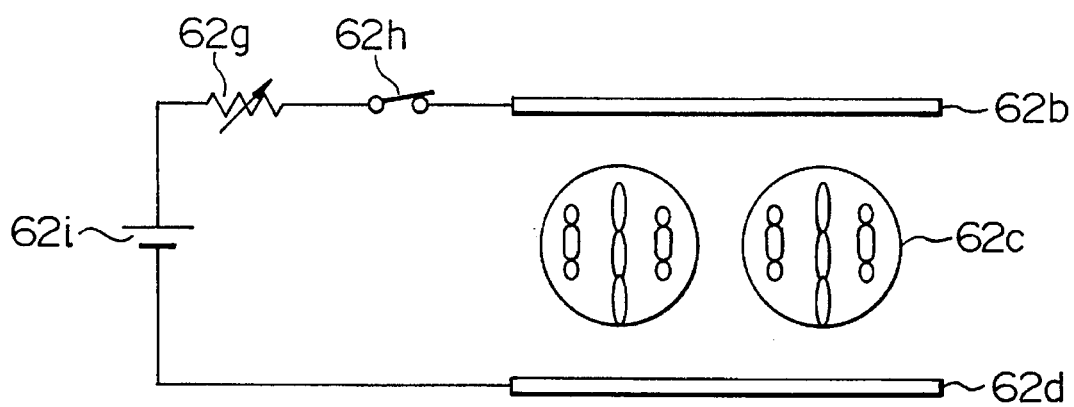
FIG. 4B is a schematic diagram showing a state of a polymer dispersed liquid crystal with a voltage applied thereto.

FIGS. 4A to 4B schematically show the principle of operation above. FIG. 4A shows a state where the switch 62h is turned off. Namely, molecules of liquid crystal 62c are arranged in a free state and hence the incident light is scattered. This causes the liquid crystal 62c to be turbid in white or cloudy. FIG. 4B shows a state where the switch 62h is turned on and hence molecules of liquid crystal 62c are arranged in a regular form. Namely, the incident light passes therethrough and the liquid crystal 62c becomes to be transparent.

Figure 5:
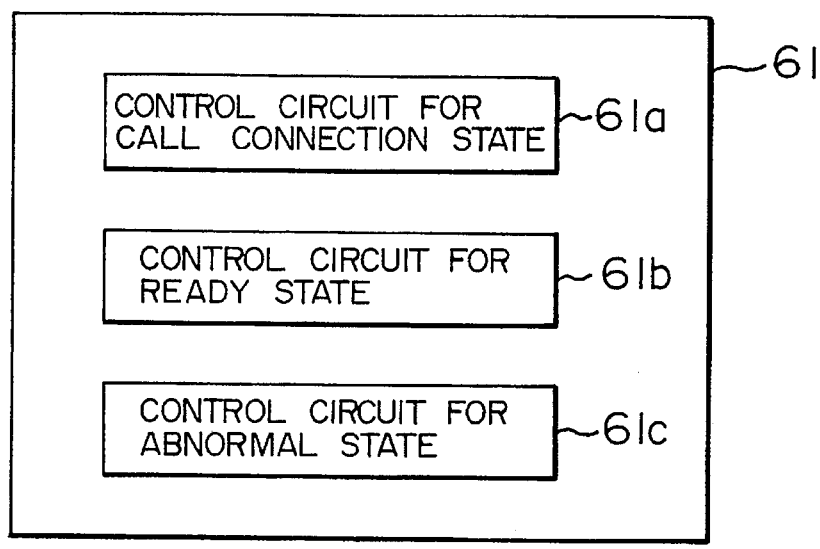
FIG. 5 is a diagram showing an example of the configuration of a liquid crystal control section.

Subsequently, FIG. 5 shows an example of the configuration of the liquid crystal control section 61. This section 61 includes a control circuit 61a for a call connection state, a control circuit 61b for a ready state, and a control circuit 61c for an abnormal state. In the call connection state, a call connection is established for the pertinent communication apparatus. Ordinarily, the bell is ringing in this state. Namely, the control circuit 61a sets the shutter 62 to the transparent state and thereby causes the color developing section 63 to develop a color of, for example, green. In an abnormal state, for example, when a paper jam takes place, the control circuit 61c sets the shutter 61c to the transparent state and thereby causes the color developing section 63 to develop a color of, for example, red. Moreover, with this provision, the internal structure (for example, the form feeding unit) of the housing can be observed without opening the mechanism of the cover or the like, which makes it possible for the user to easily recognize the abnormal position. In addition, when the apparatus is ready for operation (for example, when a facsimile device is in the transmissible state), the control circuit 61b sets the shutter 62 to the transparent state and thereby causes the color developing section 63 to develop a color of, for example, blue. In this regard, the call connection, abnormal, and ready states are respectively denoted by signals produced, for example, from the control section 1 via the bus signal line 9 of FIG. 1.

Figure 6:
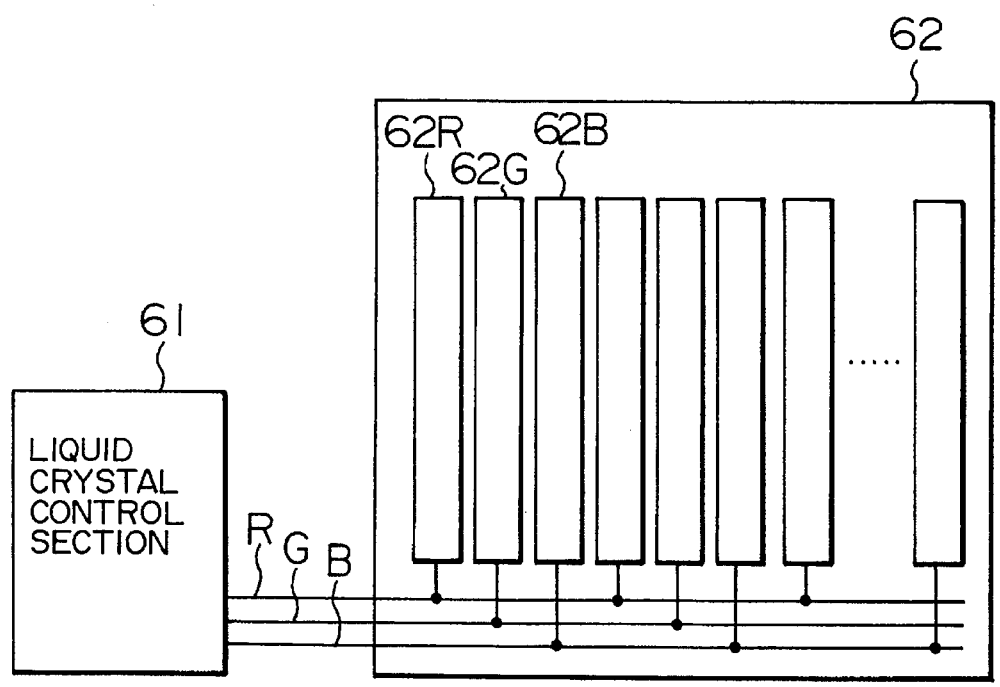
FIG. 6 is a diagram showing the configuration of a liquid crystal shutter and a concrete example a surface thereof.

FIG. 6 shows an example of the configuration of the liquid crystal shutter 62 and a specific example of the contour of a surface thereof. In this constitution, there is achieved a three-color planar display by use of rectangular elements. To display three colors, a combination of liquid crystal shutters 62R, 62G, and 62B respectively of red, green, and blue are repeatedly arranged in a sequential manner, the shutters each having a band shape. On the rear sides of the shutters related to red, green, and blue, there are associatively disposed color developing sections respectively of red, green, and blue. The bands are connected to the signal lines respectively of red, green, and blue associated therewith. For example, when the red signal line is driven, the display is achieved in red. There may be used other contours for the plane, for example, a circular shape, a parallelogram shape, and any free shape. For example, a shutter having a shape of a logotype may be employed. Moreover, an arbitrary color may naturally be selected.

Figure 7A:
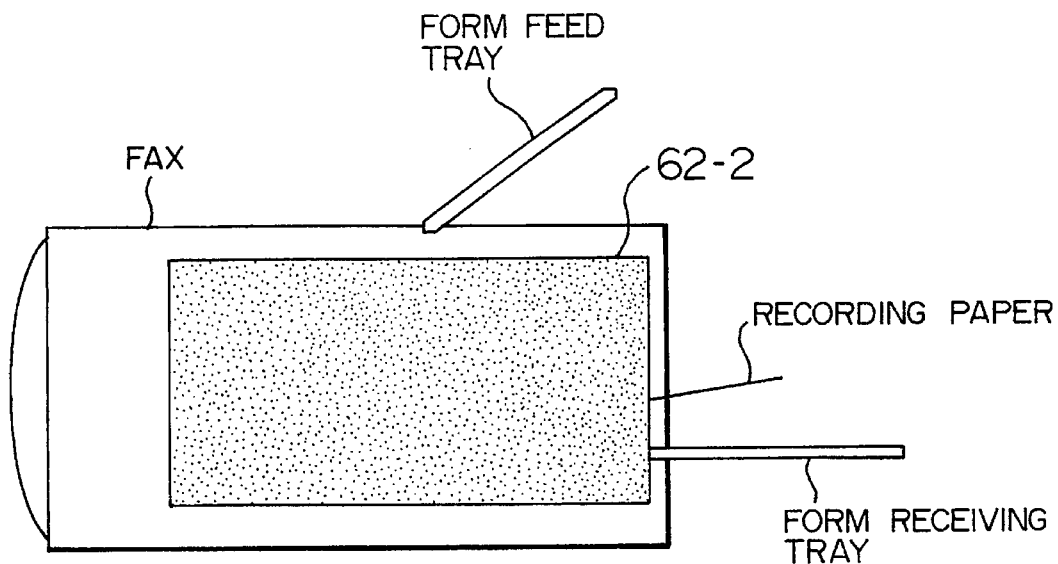
FIG. 7A is a side view showing the structure of a facsimile device in an alternative embodiment according to the present invention.
Figure 7B:
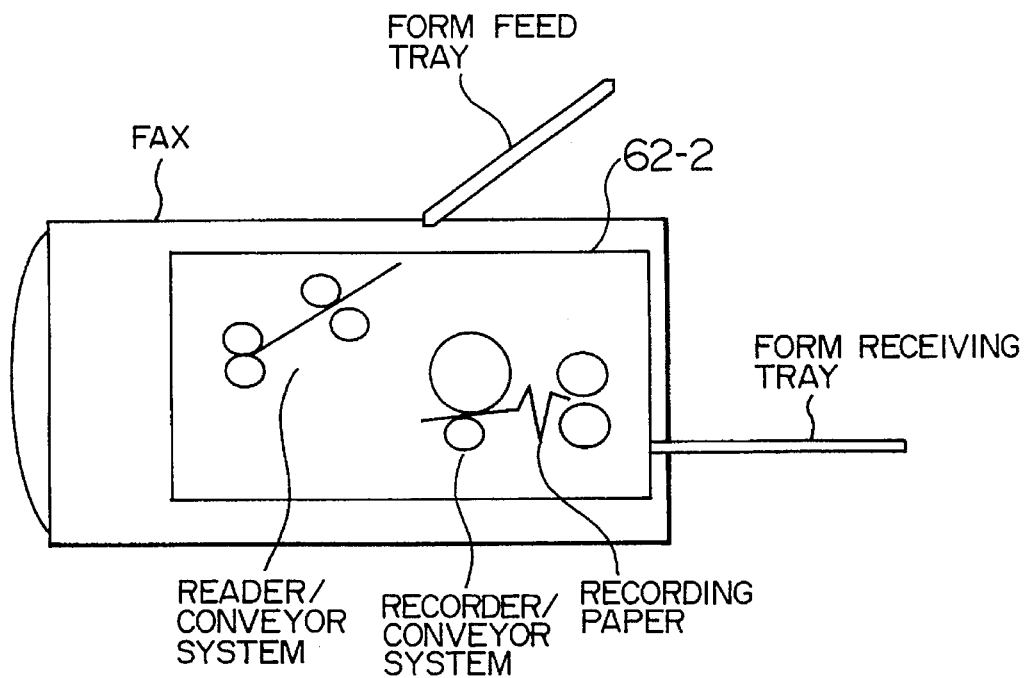
FIG. 7B is a side view of the facsimile equipment in an abnormal state.

FIGS. 7A and 7B show an example in which the liquid crystal shutter 62-1 is arranged on a side surface of the facsimile apparatus (at a position associated with a reader/conveyor system and a recorder/conveyor system as internal elements of the facsimile) so that the internal configuration thereof can be externally observed at an abnormality such as a paper jam without opening the cover or the like disposed in the facsimile device. In this situation, at the rear side of the shutter 62-2, there are not disposed any light developing section and any light interrupting member. Accordingly, when the shutter 62-2 becomes to be transparent, the internal structure can be observed from the outside. As shown in FIG. 7A, when the apparatus is normally operating, the shutter 62-2 does not allow lights to pass therethrough and hence the internal constitution cannot be externally observed. On the other hand, as shown in FIG. 7B, when the device is in an abnormal state, the shutter 62-2 becomes to be transparent and hence the reader/conveyor section and the recorder/conveyor section are visible. In consequence, the abnormal state, for example, a paper jam can be observed without opening the cover.

As above, although the liquid crystal shutter 62-2 is arranged at a position associated with the abnormality, it is also possible to use the shutter to display information items such as an information center for a failure and a model number of the apparatus.

Figure 8:
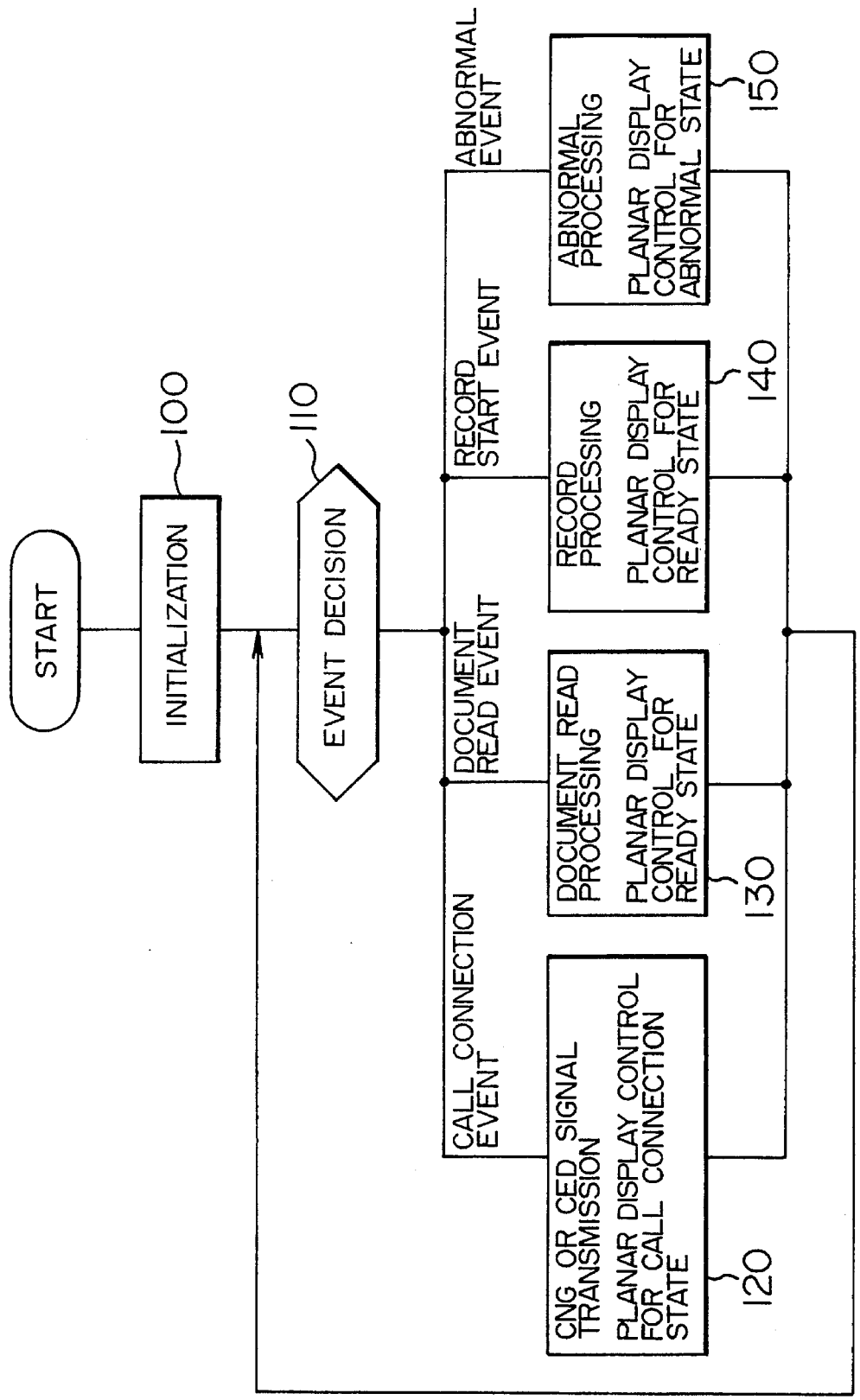
FIG. 8 is a flowchart of a software program for controlling the overall operation of the facsimile apparatus of FIG. 7A.

Next, description will be given of the software for controlling the overall operation of the facsimile equipment. FIG. 8 is a flowchart showing the overall control procedure.

When the communication apparatus is powered, an initialization procedure is conducted (step 100) and then a judgement is made to determine whether an event occurred in the apparatus (step 110). The event is possibly caused by a sensor interruption, a signal detection, or in response to a software action. Consequently, according to the contents of the cause of the event, there is determined processing to be executed. In this case, a planar display control indicates to turn a liquid crystal shutter on or off according to the object.

At an occurrence of a call connection event, a step 120 is initiated. Namely, a CNG signal (Calling Tone signal) or CED signal (Called signal) is transmitted and a planar display is conducted for the call connection state (for example, green is developed for the display). In this regard, the call sequence will be more efficient when the control to ring the bell and the planar display for the call connection state are supervised in a synchronized manner.

When a document reading event takes place, a step 130 is activated to carry out the document reading operation and the planar display for the ready state (for example, blue is developed for the display). Similarly, at an occurrence of a record start event, a step 140 is effected to conduct the recording operation and the planar display for the ready state (for example, blue is developed for the display).

On the other hand, when an abnormal event takes place, a step 150 is activated to achieve the abnormal processing, for example, to sound an alarm and to display a message and to accomplish the planar display for the abnormal state (for example, red is developed for the display).

According to the various operation states, the planar display is controlled as above.

In the embodiment according to the present invention as described above, since the liquid crystal planar shutter is disposed in a portion of the housing of the facsimile device, it is possible to visually recognize the operation state thereof from a position apart therefrom. In particular, the abnormal state such as a state of shortage of paper and a communication failure and the ready state can be easily recognized.

Also in a case where many multi-functional telephones and cordless telephone sets are installed in an office, there can be attained an advantageous effect that the users can easily recognize which one of the telephones is receiving a termination call. Moreover, also in a case where the present invention is applied to the communication apparatuses such as conference terminals and ISDN terminals and to other apparatuses, the similar effect can be advantageously obtained.

As described above, in accordance with the present invention, the operation state of the apparatus can be visually and easily recognized from a position apart therefrom. Furthermore, according to the present invention, at an occurrence of an abnormality in the apparatus, the internal structure associated with the abnormality can be observed without opening the cover or the like thereof.

While particular embodiments of the invention have been shown and described, it will be obvious to those skilled in the art that various changes and modifications may be made without departing from the present invention in its broader aspects.

We claim:

1. An office equipment apparatus having an arrangement facilitating, in response to a change in an operational state of said apparatus, observation of internal mechanisms of said apparatus without mechanically opening a housing of said apparatus, said apparatus comprising:

a planar liquid crystal shutter disposed at at least a portion of a surface of said housing of said apparatus, said shutter being set to a transparent state or a non-transparent state depending on an input signal supplied thereto; and a control means for applying to said shutter a control signal controlling said transparent or non-transparent state of said shutter;

wherein said shutter is disposed at a position on said surface of said housing so that, when said shutter is set to a transparent state, said internal mechanisms of said apparatus within said housing thereof are externally observable through said shutter, and said control means applies to said shutter, at an occurrence of an abnormality related to said internal mechanisms, a control signal for setting said shutter to said transparent state so that said internal mechanisms can be observed.

2. An apparatus according to claim 1 further including audible tone notifying means for generating an audible tone indicating an operation state of said apparatus.

3. An apparatus according to claim 2, wherein said control means applies said control signal to said shutter at a timing synchronized in time with generation of said audible tone from said audible tone notifying means.

4. An apparatus according to claim 1, wherein said shutter includes a polymer dispersed liquid crystal.

5. An apparatus as claimed in claim 1, wherein an entire area of said shutter is set to said transparent state or said non-transparent state depending on said input signal supplied thereto, such that said entire area of said shutter in said transparent state serves as a window for observation of said internal mechanisms of said apparatus without mechanically opening said housing of said apparatus.

6. An office equipment apparatus having an arrangement facilitating, in response to a change in an operational state of said apparatus, observation of internal mechanisms of said apparatus without mechanically opening a housing thereof, said apparatus, comprising:

a planar liquid crystal shutter disposed at at least a portion of a surface of said housing of said apparatus, said shutter being set to a transparent state or a non-transparent state depending on an input signal supplied thereto; and a control means for applying to said shutter a control signal controlling said transparent or non-transparent state of said shutter;

wherein said shutter is disposed at a position on said surface of said housing so that when said shutter is set to a transparent state, said internal mechanisms of said apparatus within said housing thereof are externally observable through said shutter, wherein said internal mechanisms are not a part of a structure of said shutter, and said control means applies to said shutter, at an occurrence of an abnormality related to said internal mechanisms, a control signal for setting said shutter to said transparent state so that said internal mechanisms can be observed.

7. An apparatus as claimed in claim 6, wherein an entire area of said shutter is set to said transparent state or said non-transparent state depending on said input signal supplied thereto, such that said entire area of said shutter in said transparent state serves as a window for observation of said internal mechanisms of said apparatus without mechanically opening said housing of said apparatus.

8. A photocopy/facsimile apparatus operable as at least one of a photocopy machine and a facsimile machine, said apparatus having an arrangement facilitating, in response to a change in an operational state of said apparatus, observation of internal paper feeding mechanisms of said apparatus without mechanically opening a housing of said apparatus, said apparatus comprising:

a planar liquid crystal shutter disposed at least a portion of a surface of said housing of said apparatus, said shutter being set to a transparent state or a non-transparent state depending on an input signal supplied thereto; and a control means for applying to said shutter a control signal controlling said transparent or non-transparent state of said shutter;

wherein said shutter is disposed at a position on said surface of said housing so that, when said shutter is set to a transparent state, said internal paper feeding mechanisms of said apparatus within said housing thereof are externally observable through said shutter, and said control means applies to said shutter, at an occurrence of an abnormality related to said internal paper feeding mechanisms, a control signal for setting said shutter to said transparent state so that said internal paper feeding mechanisms can be observed.

9. An apparatus as claimed in claim 8, wherein an entire area of said shutter is set to said transparent state or said non-transparent state depending on said input signal supplied thereto, such that said entire area of said shutter in said transparent state serves as a window for observation of said internal paper feeding mechanisms of said apparatus without mechanically opening said housing of said apparatus.

\* \* \* \* \*